S. G. NEAL.
TRIPLE VALVE FOR AIR BRAKE APPARATUS.
APPLICATION FILED MAY 24, 1918. RENEWED APR. 29, 1920.

1,361,279.

Patented Dec. 7, 1920.
6 SHEETS—SHEET 1.

Fig. 1.

S. G. NEAL.
TRIPLE VALVE FOR AIR BRAKE APPARATUS.
APPLICATION FILED MAY 24, 1918. RENEWED APR. 29, 1920.

1,361,279.

Patented Dec. 7, 1920.

Inventor
Spencer G. Neal
By his Attorneys

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

TRIPLE VALVE FOR AIR-BRAKE APPARATUS.

1,361,279.      Specification of Letters Patent.      Patented Dec. 7, 1920.

Application filed May 24, 1918, Serial No. 236,260. Renewed April 29, 1920. Serial No. 377,687.

*To all whom it may concern:*

Be it known that I, SPENCER G. NEAL, a citizen of the United States, and resident of the borough of Manhattan, city, county, and State of New York, have invented certain new and useful Improvements in Triple Valves for Air-Brake Apparatus, (Case No. 34,) of which the following is a specification.

This invention relates more particularly to improvements in that type of air brake apparatus illustrated in Patent No. 1,183,103, dated May 16, 1916, and also illustrated in my application for patent filed April 4, 1918, Serial No. 226,650.

The object of the invention is to simplify and improve the construction of the triple valve designed for use in air brakes of the type shown and described in said patent and in the aforesaid application for patent.

Referring to the various parts by reference characters, A designates the body of the triple valve, B the supporting bracket which connects the triple valve body to the brake cylinder, C the brake cylinder, D the emergency reservoir, and E the train pipe reservoir.

The train pipe 1 leads through suitable ports in the supporting bracket B, to be more fully hereinafter described, into the train pipe chamber 2 formed in the upper portion of the casting $a$ of the triple valve body, the upper wall of said chamber being formed by the main or train pipe diaphragm or movable abutment 3. The diaphragm 3 is clamped between the casting $a$ and the casting $b$ in which is formed the brake cylinder or equalizing chamber 4, so that the said main or train pipe diaphragm is subject on its upper side to the pressure in the brake cylinder chamber, and on its under side to train pipe pressure. The upper wall of the equalizing chamber 4 is formed by a movable equalizing diaphragm or abutment 5 which, as shown in the drawings, has a considerably greater area than the main or train pipe diaphragm 3; and said equalizing diaphragm is secured in position at the upper end of the casting $b$ by means of a casting $c$, having a chamber 6 which is normally open to atmosphere, as will be more fully hereinafter described. The upper wall of the normally vented chamber 6 is formed by an emergency reservoir diaphragm 7. This diaphragm is of equal area with the main diaphragm 3 and forms the lower wall of an emergency reservoir chamber 8. This chamber is formed in a casting $d$ and the diaphragm 7 is clamped between the castings $c$ and $d$. In the top of the casting $d$ is formed an emergency brake cylinder chamber 9, the upper wall of which is formed by an emergency diaphragm 10, said diaphragm being clamped between the upper surface of the casting $d$ and a cap plate $e$. In said plate, above the emergency diaphragm 10, is formed a supplemental train pipe chamber 11. In the casting $a$, below the train pipe chamber 2 and in direct communication therewith, is formed a quick-release chamber 12, the lower wall of which is formed by a quick-release diaphragm 13. The diaphragm 13 is secured in position by a bottom casting $f$ in which is formed a train pipe reservoir chamber 14, which is enlarged at 15 to hold a predetermined volume of air for a purpose which will be hereinafter described.

Figure 3:
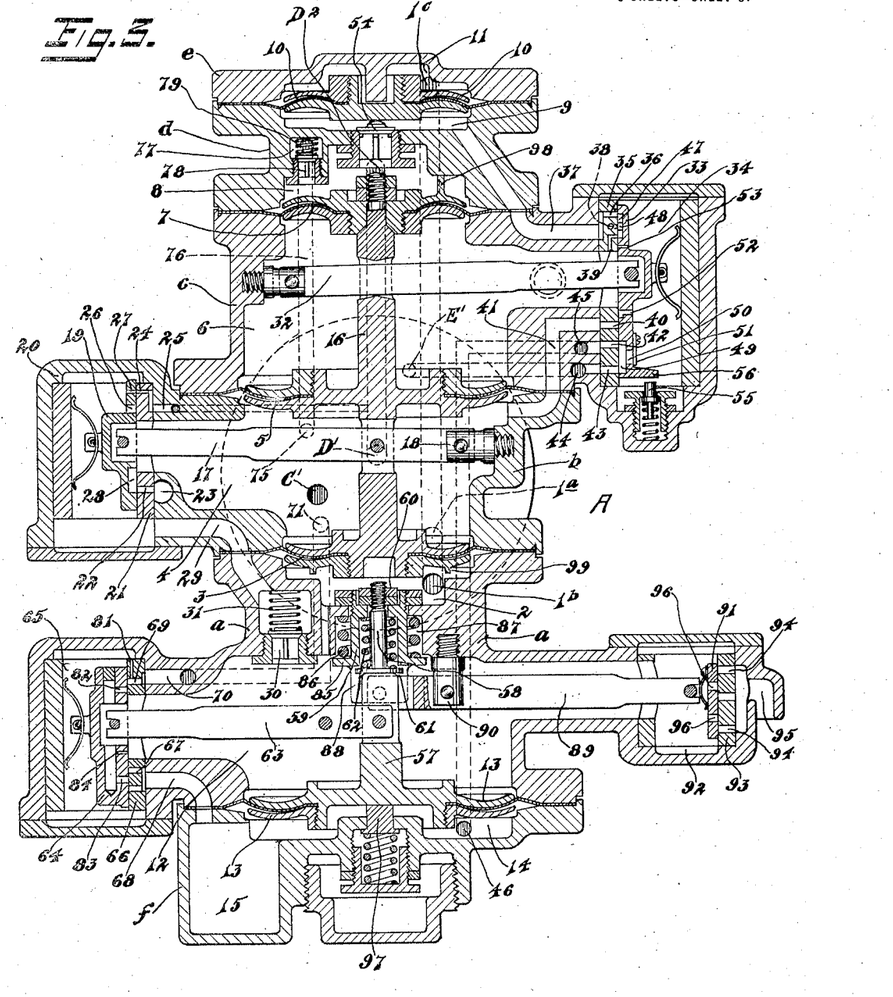
Fig. 3 a vertical sectional view of the triple valve taken on the line III—III of Fig. 2, showing the valves in full-release position after charging to normal running pressure.

The train pipe diaphragm 3, the equalizing diaphragm 5, and the emergency reservoir diaphragm 7 are rigidly connected together by means of a central stem or post 16 so that all of said diaphragms will be moved together. The post 16, within the brake cylinder chamber, is slotted, and extending through said slot and pivoted to said post is a service valve lever 17, one end of which is pivoted at 18, the other end being connected in any suitable manner with a service slide valve 19. This valve is mounted in a valve casing 20 secured to the casting $a$ and is held to its seat by a suitably arranged spring. The seat 21 of the valve 19 is provided with a brake cylinder exhaust port 22 which communicates with a large port 23 formed in the casting $b$ and communicating with the atmosphere. The valve seat 21 is also formed with a charging port 24 which is in communication through passage 25 with the emergency reservoir, as will be more fully hereinafter described. The service valve 19 is formed with a port 26 adapted to place the valve chamber in communication with the brake cylinder chamber; with a small charging port 27 to place the valve chamber in communication with the emergency reservoir, and with an exhaust cavity 28 adapted to place the brake cylinder chamber in communication with the exhaust port 22. The service valve chamber is in communication with the quick-release chamber 12 through a passage 29; and in said passage is arranged a downwardly seating check valve 30 which is held yieldingly to its seat by a spring 31. The purpose of this check valve is to permit air to pass from the quick-release chamber 12 into the service valve chamber and to prevent the passage of air from the said valve chamber back to the quick-release chamber. It is to be noted that the quick-release chamber is in open communication with the train pipe chamber 2 so that train pipe air at train pipe pressure will always be maintained in the quick-release chamber and will always flow from said chamber to the service valve chamber whenever the pressure in said valve chamber is less than train pipe pressure. With the parts in their full-release position as shown in Fig. 3, the exhaust cavity 28 places the brake cylinder chamber in communication with the atmosphere through exhaust ports 22 and 23; and places the service valve chamber in communication with the emergency reservoir through ports 27, 24 and passage 25, and the service valve port 26 is blanked and cut off from communication with the brake cylinder chamber 4.

Figure 1:
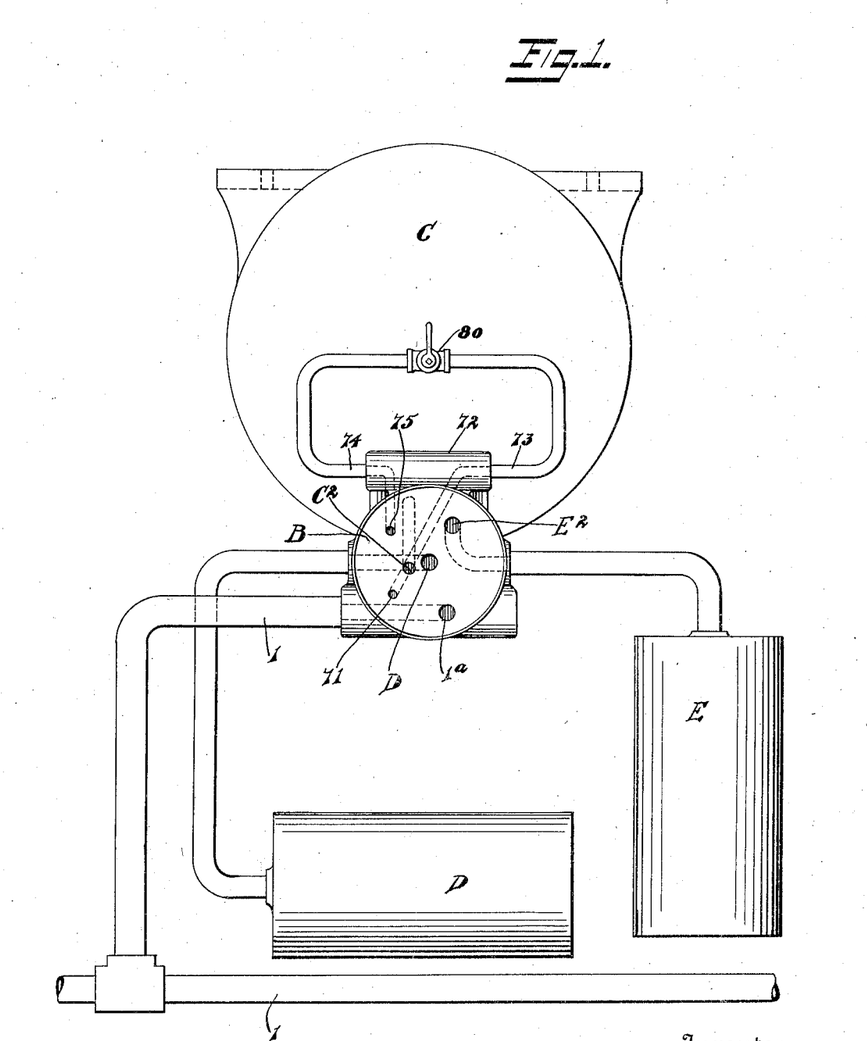
Figure 1 is a diagrammatic view of a brake unit with the triple valve proper omitted.
Figure 2:
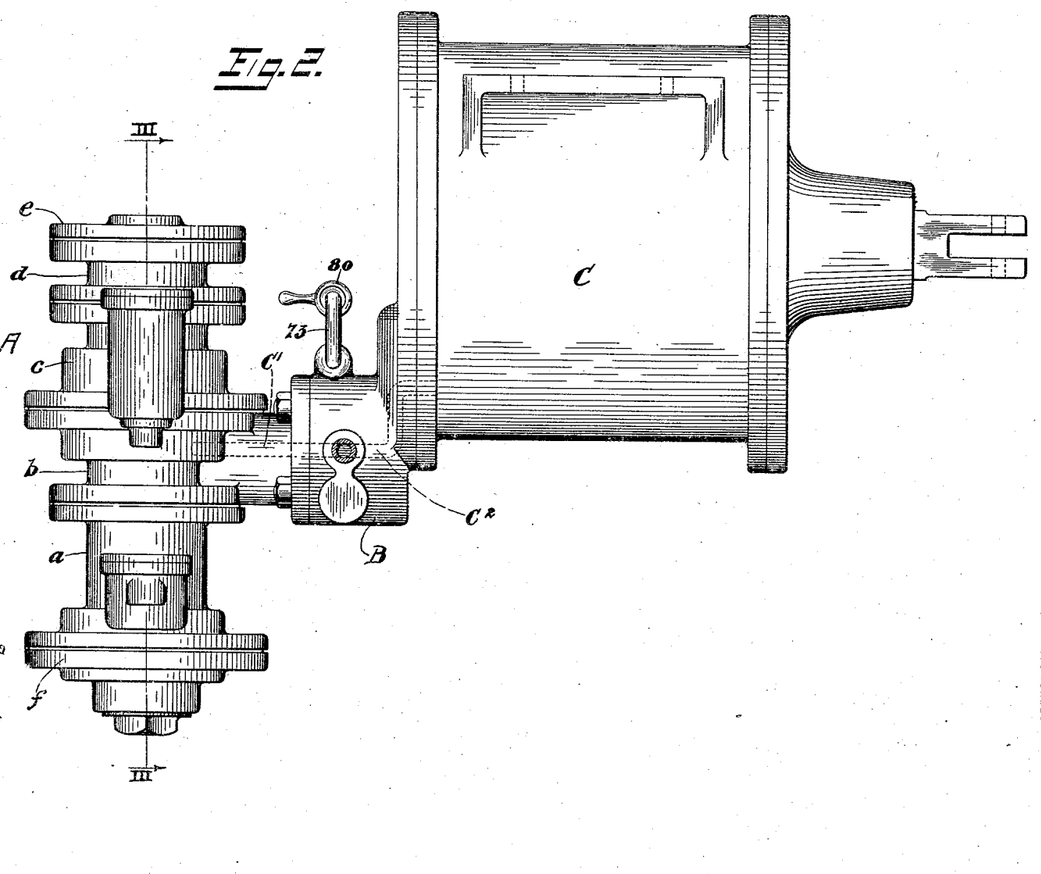
Fig. 2 a side elevation of a triple valve and brake cylinder connected.

The train pipe 1 is connected to the bracket B, as shown in Fig. 1, and communicates with a port $1^a$ therein, which port registers with a port and passage $1^b$ formed in the triple valve body and opening into the train pipe chamber 2. The passage $1^b$ is also extended upwardly through the triple valve body and opens into the supplemental train pipe chamber 11 through port $1^c$. The brake cylinder chamber 4 communicates through port $C^1$ with a passage $C^2$ in the bracket B, which passage leads directly into the brake cylinder. The emergency reservoir is connected by a pipe to the bracket B, which pipe is in communication with a port D, said port registering with a corresponding port $D^1$ in the triple valve body, this latter port communicating through a vertical passage in the triple valve body with a port $D^2$ which opens into the emergency reservoir chamber 8. The charging passage 25 connects with the emergency reservoir port $D^1$, as shown in dotted lines in Fig. 3.

The main valve stem 16 is transversely slotted within the vented chamber 6, and extending loosely through said slot is an emergency lever 32, one end of which is pivoted to a suitable support secured to the inner side of the casting $c$. The other end of said lever is connected to an emergency valve 33 which is mounted in an emergency valve chamber 34. The valve 33 slides on seat 35 and is held to said seat by a suitably arranged spring. The valve seat 35 is formed with a port 36 which is adapted to place the valve chamber in communication with the emergency brake cylinder chamber through passage 37. Said seat is also formed with a vent port 38 opening into the atmosphere, and with a vent passage 39 which communicates with the chamber 6 and opens on the face of said valve seat. The valve seat 35 is also formed with an emergency brake cylinder port 40 which is in communication with the brake cylinder chamber 4 through passage 41. It is also formed with train pipe reservoir ports 42 and 43, the latter being in communication with the train pipe reservoir through a passage 44 and port $E^1$ which registers with a corresponding port $E^2$ in the bracket B, this latter port being in communication with a pipe leading to the train pipe reservoir. The port 42 is in communication with the train pipe reservoir chamber 14 through a connected passage 45 and port 46 opening into the said chamber 14.

The emergency valve 33 is provided on its face, near its upper end, with an exhaust cavity 47 having a lateral extension 48 which registers with the vent port 38 at all times except in emergency applications of the brakes. In full-release position the cavity 47 is then in communication with the port 36 and the vent passage 39 to place the emergency brake cylinder chamber and chamber 6 in communication with the atmosphere. The emergency valve, near its lower end, is formed, on its face, with a charging cavity 49, which, except when in emergency position, connects the ports 42 and 43 to permit the train pipe reservoir to be charged from train pipe chamber 14. A port 50 extends through the emergency valve and places the valve chamber in communication with the charging cavity 49, so that train pipe reservoir air will flow through said passage into the emergency valve chamber 34. A flap valve 51 closes said port 50 and prevents air passing from the valve chamber 34 into the charging cavity 49, but permits air to flow freely from said charging cavity into the chamber 34 so that train pipe pressure will always be in said valve chamber except in emergency position of the valve.

The emergency valve is formed with an emergency port 52 which is adapted to be brought into register with the emergency brake cylinder port 40 when the valve is moved to an emergency application position. The port 52 is formed with a slight downward extension, for a purpose which will be hereinafter described. The port 36 in the valve seat 35 is formed with a slight upward extension; and the valve 33 is formed with a small port 53 which is adapted to place the valve chamber in communication with the vented chamber 6 upon an emergency application of the brakes only.

A downwardly seating check valve 54 controls communication between the emeregency reservoir chamber 8 and the emergency brake cylinder chamber 9; and said valve is held to its seat by the emeregncy abutment or diaphragm 10. It is to be noted that chamber 9 is normally vented to atmosphere and that train pipe pressure is in chamber 11 above the diaphragm 10, said pressure forcing the diaphragm downwardly and maintaining the valve 54 seated and communication closed between the emergency reservoir chamber 8 and the emergency brake cylinder chamber 9.

In the lower part of the emergency valve chamber 34 is mounted a spring-pressed plunger 55 which is adapted to be engaged by foot 56 on the lower end of the emergency valve when the said valve is moved downwardly.

The quick-release diaphragm 13 is provided with an upwardly extending central stem 57 whose upper end abuts against a spring-pressed plunger 58, mounted in a vertically movable sleeve 59. The upper end of the plunger stem is threaded to receive lock nuts 60 which are adapted to engage the upper surface of the sleeve. The plunger 58 is formed with a head 61 between which and the upper wall of the sleeve is arranged a coil spring 62. Pivoted in the quick-release chamber is a quick-release lever 63, one end of said lever being pivotally connected to the stem 57, the other end being connected with a quick-release valve 64 mounted in a quick-release valve chamber 65. The seat 66 of the quick-release valve is provided with a pair of twin ports 67 connected together by a cavity on the inner face of the valve seat, said cavity being connected to the train pipe reservoir chamber by a passage 68, so that said chamber is always in communication with the twin ports 67. The valve seat 66 is also formed with a port 69 which is in communication with a passage 70, said passage leading to a port 71 in the bracket B. Port 71 is connected by a passage 72 in the bracket B to pipe 73. Pipe 73 extends around the bracket B and is connected to a port 74 in said bracket, which port registers with a port 75 in the triple valve body. The port 75 is connected by a passage 76 to a small chamber 77 above the emergency reservoir chamber 8. Communication between chambers 77 and 8 is closed by a downwardly seating check valve 78, said valve being held to its seat by a light spring 79. This valve prevents air passing from chamber 77 into chamber 8, but permits emergency reservoir air to pass into chamber 77 and thence through passage 76, ports 75 and 74 into the pipe 73. In the pipe 73 is arranged a maintaining valve 80 which, when closed, cuts off communication between the passage 70 and the emergency reservoir. When the triple valve is arranged for quick-release operation the maintaining valve 80 must be open. When said valve is closed the triple valve will operate only in graduated release. The valve seat 66 is formed with a small leak port 81 which at all times maintains the valve chamber 65 in communication with the passage 70, so that in the valve chamber there always will be the normal charging or running pressure to hold the quick-release valve to its seat.

The quick-release valve is provided near its upper end with a quick-release port 82, which, when the valve is in its quick-release position, places the quick-release chamber 12 in communication with the port 69 and the passage 70, thereby permitting emergency reservoir air to enter the quick-release chamber 12 and the train pipe chamber 2, which, as hereinbefore described, is in open communication with the quick-release chamber. The quick-release valve is also formed with a port 83 which normally lies between the twin ports 67 but which, upon a movement of the quick-release valve in either direction, places the train pipe reservoir chamber 14 in communication with the quick-release chamber 12. The train pipe chamber 14 and the connected train pipe reservoir are normally disconnected from the chamber 12 and the train pipe but, through the port 83 and one of the twin ports 67, are connected to the quick-release chamber, both in applications of the brakes and in the release of the brakes. In the release of the brakes port 83 is in register with the upper one of the twin ports 67; while in an application of the brakes the slide valve is moved downwardly and said port 83 is in register with the lower one of the said twin ports. The quick-release valve 64 is also formed with a small equalizing port 84 through which the pressure in the train pipe reservoir chamber 14 will be equalized into the quick-release chamber after an emergency application of the brakes. The time required for this equalization to take place determines the period during which the train pipe venting valve 91 is open upon an emergency application, as will be more fully hereinafter described. The enlargement 15 of the train pipe reservoir chamber is of such capacity that the required predetermined time will lapse before equalization of pressures in chambers 14 and 12. Upon an emergency application of the brakes the quick-release valve is moved downwardly sufficiently to bring equalizing port 84 into communication with the upper one of the twin ports 67.

The sleeve 59 is formed with a laterally extending flange 85 adapted to engage a strong spring 86 mounted in a socket 87 in the upper wall of the quick-release chamber. The flange 85 extends beyond the margin of the socket and is adapted to be brought into engagement with the rigid wall of the quick-release chamber, said wall forming a positive stop for the sleeve 59. The head 61 of the plunger 58 is adapted to engage the end surface of the sleeve 59 when the spring 62 has been sufficiently compressed by the upward movement of the stem 57. The spring 86 is much stronger than the spring 62 and consequently requires a considerably greater pressure to compress it and to bring the flange 85 into engagement with its fixed stop.

The sleeve 59 is formed with a downwardly extending lug 88 to which is pivoted one end of a lever 89, said lever being pivoted on a post 90 mounted in the quick-release chamber. The outer end of the lever 89 is connected to a train pipe venting valve 91 mounted in a valve chamber 92. The seat 93 of the valve 91 is provided with a plurality of ports 94, and the valve 91 is provided with ports 96 which are adapted to be brought into engagement with ports 94. These ports are so arranged as to open and close simultaneously. The ports 94 communicate with an exhaust passage 95 so that when the valve 91 is in its emergency application position there will be a free passage of large capacity connecting chamber 12, and consequently the train pipe chamber 2, to atmosphere.

In the lower wall of the train pipe reservoir chamber 14 is mounted a spring-pressed plunger 97 which is adapted to be engaged by the central part of the abutment 13, said abutment forming a yielding stop for the quick-release diaphragm and insuring said diaphragm and its connected stem 57 returning to its normal position upon an equalization of pressures in chambers 12 and 14.

The emergency reservoir diaphragm 7 is provided on its upper side with a stop lug 98 which is adapted to engage a fixed part of the triple valve body to stop the said diaphragm in its upper position. The main or train pipe diaphragm 3 is provided with stop lugs 99 which are adapted to engage a fixed part of the triple valve body to stop the said main diaphragm in its lowermost or emergency position.

*Charging operation.*

Figure 6:
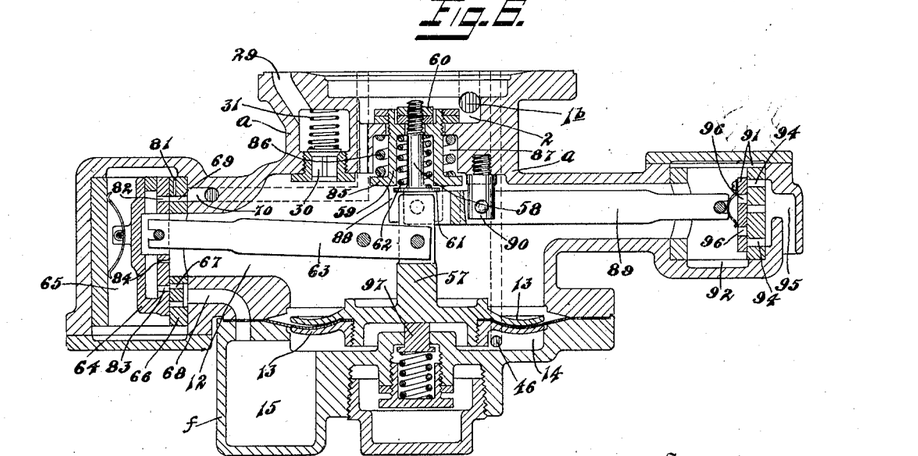
Fig. 6 a vertical sectional view of the quick-release portion of the triple valve showing the parts in position for a quick release of the brakes.

In charging the apparatus, train pipe air flows through port $1^a$ and port $1^b$ into the train pipe chamber 2 and through port $1^c$ into supplemental train pipe chamber 11. From chamber 2 the air also flows freely into chamber 12. Air will pass from the quick-release chamber 12 around check valve 30, through passage 29 into the service valve chamber, and thence through the charging port 24, passage 25, into the passage connecting port $D^1$ with the emergency reservoir chamber 8, thereby charging the emergency reservoir. Train pipe air in supplemental train pipe chamber 11 will hold diaphragm 10 in engagement with the valve 54 and prevent emergency reservoir air passing said valve into the emergency brake cylinder chamber 9. The increasing pressure of air in chamber 12 will depress diaphragm 13 and thereby move the quick-release valve upwardly on its seat, as shown in Fig. 6. This will place port 83 in communication with the upper one of the twin ports 67 and thereby permit air to flow from the chamber 12 into train pipe reservoir chamber 14 and thence through port 46, passage 45, port 42, cavity 56, port 43, passage 44, port $E^1$, to the service reservoir. Air will also pass valve 51 into the emergency valve chamber 34 so that train pipe pressure will be always registered in said valve chamber. Upon an equalization of pressures in chambers 12 and 14 the plunger 97 will move the diaphragm 13 to its neutral or midway position and bring stem 57 into engagement with plunger 58, thereby returning the release valve to lap position.

Figure 4:
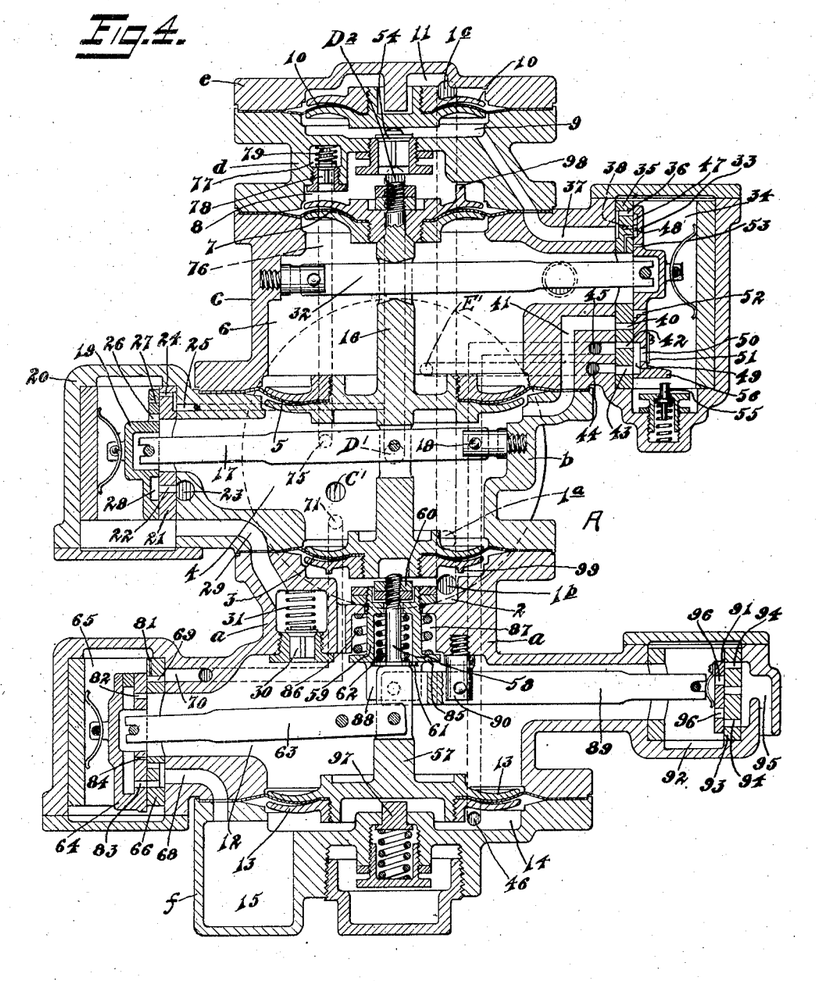
Fig. 4 a similar view with the parts in position for a service application of the brakes.

*Service application.* (Fig. 4.)

For a service application of the brakes a slow reduction in train pipe pressure is made. Upon a reduction of pressure in chamber 2 the superior pressure in the emergency reservoir chamber 8 depresses the diaphragm 7 and also, through the connected stem 16, the diaphragms 5 and 3. The slot in the stem 16 through which the emergency lever 32 extends is suitably larger transversely than the said lever, so that said stem may have a slight downward movement without engaging said lever. This downward movement of the stem 16 moves the service valve 19 to bring the service port 26 into communication with the brake cylinder chamber 4. This downward movement of the valve 19 also cuts off communication between the brake cylinder chamber and the exhaust ports, and between emergency reservoir and train pipe. Train pipe air will then flow from quick-release chamber 12 and train pipe chamber 2 past valve 30, through passage 29, through valve casing 20, port 26, to the brake cylinder chamber 4, and thence through brake cylinder port $C^1$. The reduction in train pipe pressure permits the pressure in train pipe reservoir chamber 14 to move diaphragm 13, which, through its stem 57 and connected lever 63, lowers the quick-release valve to bring port 83 into communication with the lower one of the twin ports 67. This places the train pipe reservoir in communication with the quick-release chamber 12 so that train pipe reservoir air will flow to the train pipe and the brake cylinder. Brake cylinder pressure will be built up in chamber 4 below the large equalizing diaphragm 5, and when said pressure operating on the excess area of the equalizing diaphragm is sufficient, with the train pipe air pressure operating on the under side of the main diaphragm 3, to overcome the emergency reservoir pressure on the upper side of diaphragm 7, the service valve will be moved to lap position. A subsequent reduction in train pipe pressure will result in a further increase in brake cylinder pressure. Any leak-down of brake cylinder pressure will result in the emergency reservoir air moving the diaphragms downwardly to place the service valve in application position, whereupon the brake cylinder pressure will be built up to the desired degree, as before described.

When the train pipe pressure is reduced the superior pressure in the train pipe reservoir chamber 14 will move diaphragm 13 and compress spring 62 until the head 61 of the plunger engages the end of the sleeve 59, whereupon the movement of the diaphragm will be stopped. The spring 86 is so tensioned that it will not be compressed except by a strong superior pressure in chamber 14, which superior pressure is only obtained to the proper degree upon an emergency application of the brakes. It is to be noted that the spring-pressed plungers 58 and 97 maintain the diaphragm 13 and the release valve 64 in their proper normal positions.

Figure 7:
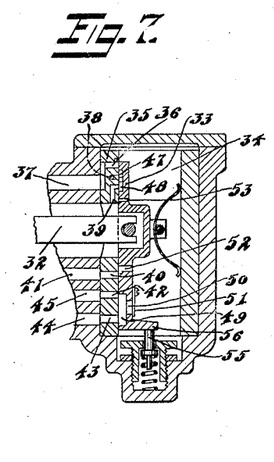
Fig. 7 a detail sectional view of the emergency valve in maximum-service position.
Figure 8:
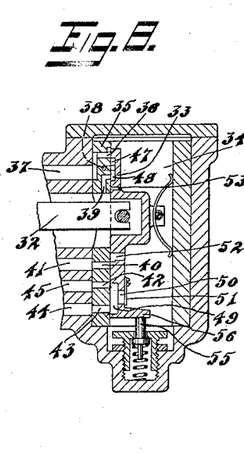
Fig. 8 a detail sectional view of the emergency valve in lap position after maximum service.
Figure 9:
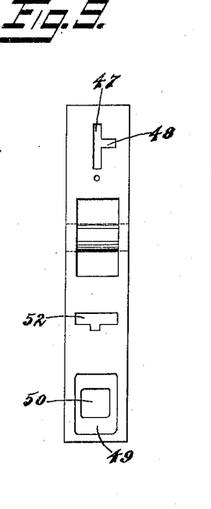
Fig. 9 a face view of the emergency valve.

*Maximum service.* (Fig. 7.)

Upon a maximum service application of the brakes train pipe pressure has equalized with brake cylinder pressure, and diaphragms 3, 5 and 7 are so proportioned that upon such equalization of pressures the service valve will be moved to lap position. Should the train pipe pressure leak down after such maximum service application the pressure of air in the emergency reservoir chamber 8 will depress diaphragm 7 sufficiently to take up the lost motion in the slot of the stem 16 and cause the upper wall of said slot to engage the emergency lever 32 and move downwardly the emergency valve. As said valve moves downwardly the extension of port 52 will be brought partly into register with brake cylinder port 40; and the upper end of the said valve will uncover the upward extension of port 36. This will permit train pipe air from chamber 34 to equalize on opposite sides of diaphragm 10, thereby permitting the emergency reservoir air to lift valve 54 and pass into chamber 9 and thence through passage 37, port 36, and the uncovered extension thereof into the valve chamber 34. From this chamber the air will pass through port 52 and its downward extension thereof into brake cylinder port 40 and thence through passage 41 to the brake cylinder chamber 4, and to the brake cylinder through port $C^1$. This will cause the brake cylinder pressure to build up in proportion to the leak-down of the train pipe air, and until such built-up brake cylinder pressure is sufficient to counterbalance or overcome the emergency reservoir air in chamber 8. When this has taken place the emergency valve will be moved back to lap position and the operation will be repeated from time to time whenever and as the train pipe air leaks down. It is manifest, therefore, that after an equilization of train pipe and brake cylinder pressures any leak-down of the train pipe air will result in a further upbuilding of the brake cylinder pressure; and should the brake cylinder pressure and train pipe pressure leak down a still greater upbuilding of the brake cylinder pressure will result, for the reason that air will continue to flow from the emergency reservoir into the brake cylinder until the valves are moved back to lap position. Whenever the brake cylinder pressure exceeds train pipe pressure valve 30 will prevent brake cylinder pressure moving back to chamber 12 and to the train pipe. The spring plunger 55 will assist the increasing brake cylinder pressure in chamber 4 to move the emergency valve back to lap position, in which position the port 52 will be out of register with the brake cylinder port 40.

This operation of the emergency valve will result in a brake cylinder pressure greater than maximum service pressure, that is greater than the pressure resulting from an equalization of train pipe pressure and brake cylinder pressures; and the extent of this increased brake cylinder pressure will be dependent upon the degree of reduction in train pipe pressure below the point of equalization. It is also manifest that the rate of flow of air into the brake cylinder chamber will depend upon the rate of train pipe leakage. The increasing brake cylinder pressure will move the emergency valve back to lap position, unless the train pipe pressure is reduced very rapidly as for an emergency application of the brakes, which rapid reduction in train pipe pressure will result in the emergency valve moving downwardly to the limit of its movement, as will be more fully described in connection with the emergency application of the brakes.

Graduated release.

When the triple valve is operating in graduated release the train pipe pressure may be increased to any desired degree, the increased train pipe pressure operating with the brake cylinder pressure to overcome the emergency reservoir pressure in chamber 8, and moving the service valve to cut off communication between the brake cylinder chamber and the valve chamber 20 and to place the brake cylinder chamber in communication with the exhaust ports through passage 28. When the brake cylinder pressure is reduced to such an extent that the emergency reservoir pressure in chamber 8 will be sufficient to move the diaphragms downwardly, the service valve will be moved to lap position. A further increase in train pipes pressure will repeat this operation so that the brake cylinder pressure may be stepped down to any desired extent until a full release is secured and the train pipe pressure has been increased to normal running pressure. It is manifest that brake cylinder pressure may be stepped up or down as desired, by decreasing or increasing the train pipe pressure.

Quick release. (Fig. 6.)

When it is desired that the triple valve shall operate in quick release, the maintaining valve 80 is placed in open position. Upon an increase of train pipe pressure for a release of the brakes the quick-release diaphragm 13 will be depressed against the pressure of the spring plunger 97, thereby uncovering the release port 69 and permitting emergency reservoir air to flow from chamber 77 through passage 76, port 75, pipe 73, port 71 and passage 70, port 65, into the quick-release chamber 12 and thence into the train pipe chamber 2 and to the train pipe. This will result in a quick rise of train pipe pressure locally under each car. The tension of the spring operating on plunger 97 may be adjusted to require a predetermined rise in train pipe pressure in order to secure the quick release of the brakes. The port 83 of the quick-release valve places the quick-release chamber in communication with the train pipe reservoir chamber 14 through the upper twin port 67, so that the train pipe reservoir will be recharged from the quick-release chamber upon a quick release of the brakes. Ports 82 and 69 are so arranged with respect to each other that port 82 will be in register with port 69 slightly before port 83 is in register with the upper twin port 67, thereby assuring an equalization of train pipe and emergency reservoir air before the differential of pressure in chambers 12 and 14 is disturbed. This assures the complete equalization of pressures in chamber 12 and emergency reservoir before the pressure in chamber 14 is built up sufficiently to move the quick-release valve back to lap position.

Emergency application. (Fig. 5.)

For an emergency application of the brakes a sudden reduction in train pipe pressure is made. Upon a sudden reduction of train pipe pressure emergency reservoir air will depress diaphragm 7, stem 16 and the connected diaphragms 5 and 3. This will move service valve 19 to cut off the charging port 27 from the corresponding and registering port 24, and will close the exhaust ports and place valve casing 20 in communication with the brake cylinder chamber 4. The sudden reduction in train pipe pressure in chamber 12 will permit the air pressure in chamber 14 to move the diaphragm 13 and stem 57 upwardly, the stem 57 engaging the plunger 58 and compressing the spring 62 until the head 61 of the plunger 58 engages the sleeve 59. The superior pressure in the chamber 14, upon an emergency reduction of train pipe pressure, will be sufficient to force the sleeve 59 upwardly and compress the spring 86 until the flange 85 engages the upper wall of the quick-release chamber. The upward movement of the sleeve 59 will swing the lever 89 and open the chamber 12 to atmosphere through the ports 96, 94 and exhaust passage 95, thereby almost instantly reducing the train pipe pressure to atmosphere. The full upward movement of the diaphragm 13 and its connected stem will bring the equalizing port 84 of the quick-release valve into communication with the upper one of the twin ports 67, so that the air trapped in the train pipe reservoir chamber 14, as herein described, will leak into the chamber 12. As soon as there has been a sufficient reduction of pressure in chamber 14, spring 86 will force the sleeve 59 downwardly, and with it the plunger 58, and thereby close the train pipe vent valve 91. Thereafter there will be an equalization of pressures on opposite sides of the diaphragm 13, through the leak port 84, which port remains in communication with the port 67 during the movement of the sleeve 59, and as soon as the said equalization takes place the spring 62 will force the plunger 68 and the stem 57 downwardly until the diaphragm 13 is in its normal position between the plungers 58 and 97.

The full downward movement of the diaphragm 7 and stem 16 moves downwardly the emergency lever 32 and causes the emergency valve to close the vent port 47 and open communication between the chamber 9 and the emergency valve chamber 34, thereby permitting train pipe reservoir air to flow from said chamber 34 into chamber 9 to raise the emergency diaphragm or abutment 10. The emergency port 52 is brought into register with the brake cylinder port 40, and the port 42 leading to the train pipe reservoir chamber 14 is closed. Port 53, however, leading to the train pipe reservoir, is in communication with the emergency valve chamber 34 so that the train pipe reservoir will be cut off from the train pipe but will be maintained in communication with the emergency valve chamber, so that air may pass from said reservoir into said chamber past the flap valve 51 whenever the pressure in said chamber is less than the pressure in the train pipe reservoir, the said flap valve, however, preventing air passing from said valve chamber to said reservoir when the superior pressure is in the valve chamber. When the train pipe pressure has equalized on opposite sides of the diaphragm 10 emergency reservoir air will lift valve 54 and permit emergency reservoir air passing into chamber 9 and thence into the emergency valve chamber 34, through emergency port 52 to brake cylinder. Emergency reservoir air will also pass through port 53 into chamber 6, so that there will be an equalization of pressures in brake cylinder chamber 4, chamber 6 and emergency reservoir chamber 8.

Figure 5:
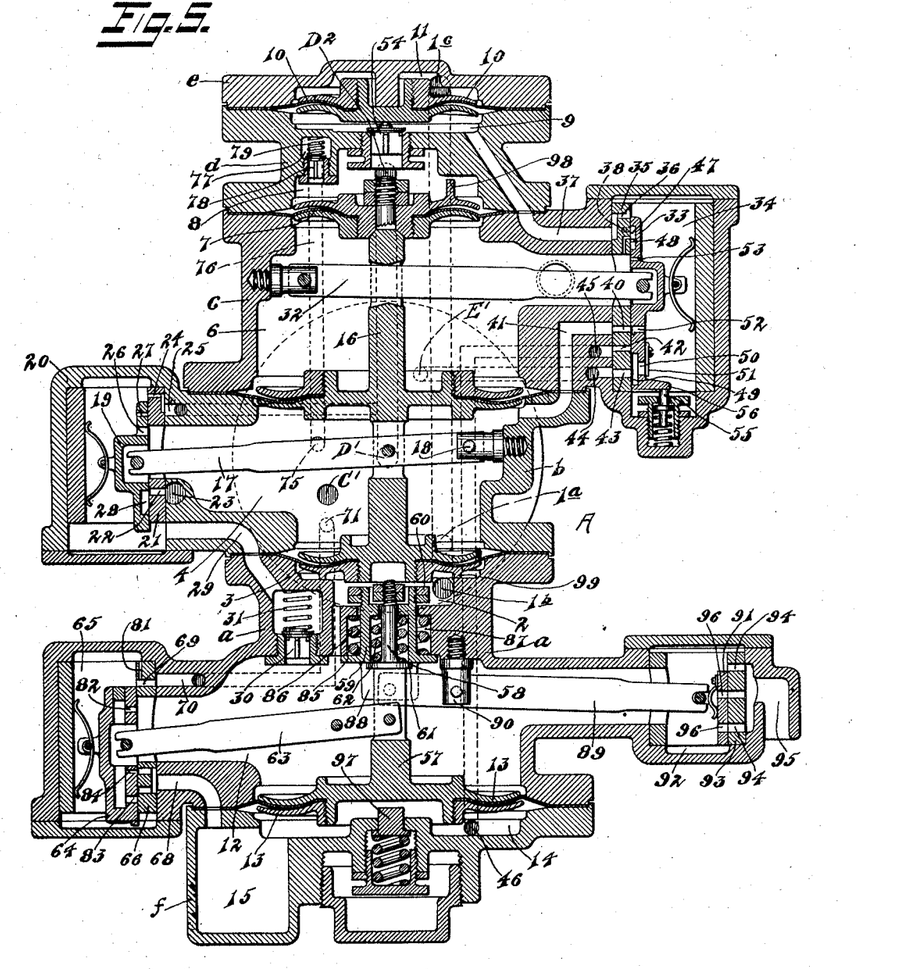
Fig. 5 a similar view showing the parts in position for an emergency application of the brakes.

When the emergency valve is moved downwardly to emergency position, as shown in Fig. 5, the plunger 55 will be moved downwardly against the spring.

What I claim is:

1. A triple valve comprising a train pipe chamber, a train pipe diaphragm forming one wall of said chamber, an equalizing diaphragm, a brake cylinder chamber being formed between said main and equalizing diaphragms, a service valve adapted to be operated by the movement of the main diaphragm and controlling communication between the train pipe chamber and the brake cylinder chamber and from said brake cylinder chamber to atmosphere, a normally vented chamber on the opposite side of the equalizing diaphragm from the brake cylinder chamber, an emergency reservoir diaphragm, an emergency reservoir chamber, said emergency reservoir diaphragm separating the emergency reservoir chamber from the normally vented chamber, means for rigidly connecting together all of said diaphragm, an emergency valve adapted to be moved through said diaphragms and to connect the emergency reservoir chamber to the brake cylinder chamber upon a sudden reduction in train pipe pressure for an emergency application of the brakes, and means for permitting the diaphragms to move for service applications of the brakes without operating the emergency valve.

2. A triple valve as defined in claim 1 and provided with an emergency diaphragm subject on one side to train pipe pressure and on the opposite side to atmospheric pressure and normally holding closed a check valve controlling communication between the emergency reservoir chamber and the vented chamber, and means whereby the emergency valve will permit train pipe air to equalize on opposite sides of the emergency diaphragm and thereby permit emergency reservoir air to flow into the emergency valve chamber and from said chamber to the brake cylinder chamber.

3. A triple valve in accordance with claim 1 contained within a single valve body and wherein the service valve and emergency valve are slide valves and are connected to and operated by the diaphragms by means of interposed levers.

4. A triple valve comprising a train pipe chamber, a train pipe diaphragm forming one wall of said chamber, an equalizing diaphragm of larger area than the main diaphragm, a brake cylinder chamber being formed between said main and equalizing diaphragms, a service valve adapted to be operated by the movement of the main diaphragm and controlling communication between the train pipe chamber and the brake cylinder chamber and from said brake cylinder chamber to atmosphere, a normally vented chamber on the opposite side of the equalizing diaphragm from the brake cylinder chamber, an emergency reservoir diaphragm of equal area with the main diaphragm, an emergency reservoir chamber, said emergency reservoir diaphragm separating the emergency reservoir chamber from the normally vented chamber, means for rigidly connecting together all of said diaphragms, an emergency valve adapted to be moved through said diaphragms and to connect the emergency reservoir chamber to the brake cylinder chamber upon a sudden reduction in train pipe pressure for an emergency application of the brakes, and means for permitting the diaphragms to move for service applications of the brakes without operating the emergency valve.

5. A triple valve for air brake apparatus as defined in claim 4, and provided with means whereby the emergency valve will connect the emergency reservoir with the brake cylinder when the train pipe pressure is below the brake cylinder pressure.

6. A triple valve for air brake apparatus as defined in claim 4 and provided with a quick-release chamber and a quick-release diaphragm, and a quick-release valve operated by said quick-release diaphragm upon an increase of train pipe pressure to connect an emergency reservoir with the train pipe for a quick release of the brakes.

7. A triple valve for air brake apparatus as defined in claim 4 and provided with a quick-release chamber in open communication with the train pipe chamber, a quick-release diaphragm forming one wall of said quick-release chamber, a train pipe reservoir chamber on the opposite side of said quick-release diaphragm, and a valve operated by said quick-release diaphragm upon an increase of train pipe pressure to place an emergency reservoir in communication with the quick-release chamber and said chamber in communication with the train pipe reservoir chamber.

8. A triple valve as defined in claim 7 and provided with a valve for opening the quick-release chamber to atmosphere, means for operating said vent valve and the quick-release valve upon a sudden reduction in train pipe pressure to open the quick-release chamber to atmosphere and to close the train pipe reservoir chamber from the quick-release chamber except for a small leak port, and means to close the vent valve when the pressures in the train pipe reservoir chamber and the quick-release chamber have equalized through said leak port.

9. A triple valve as defined in claim 8 and wherein the quick-release diaphragm is normally balanced between two springs which are adapted to yield in response to service reductions in train pipe pressure and increases in train pipe pressure, the vent valve being controlled by a stronger spring which yields only upon a sudden and pronounced reduction in train pipe pressure.

10. A triple valve provided with a service valve, a train pipe chamber, a brake cylinder chamber, means operating upon a slow reduction of train pipe pressure to move said service valve to place the train pipe chamber in communication with the brake cylinder chamber for a service application of the brakes by train pipe pressure alone, an emergency valve, an emergency reservoir chamber, means operating upon a sudden reduction in train pipe pressure to move the emergency valve to place the emergency reservoir chamber in communication with the brake cylinder chamber, and means whereby the emergency valve will connect the emergency reservoir with the brake cylinder chamber when the train pipe pressure is below the brake cylinder pressure, the increasing brake cylinder pressure compensating for the loss of train pipe pressure and moving the service and emergency valves to lap position.

11. A triple valve provided with means operating upon a slow reduction of train pipe pressure to connect the train pipe to a brake cylinder for a service application of the brakes by train pipe pressure alone, and means operating upon a sudden reduction of train pipe pressure to connect an emergency reservoir with the brake cylinder for an emergency application of the brakes, said means also connecting the emergency reservoir with the brake cylinder when the train pipe pressure is below brake cylinder pressure to augment the brake cylinder pressure and move the triple valve back to lap position and thereby cut off communication between the emergency reservoir and the brake cylinder.

12. A triple valve provided with means operating upon a slow reduction of train pipe pressure to connect the train pipe to a brake cylinder for a service application of the brakes by train pipe pressure alone, and means operated by emergency reservoir pressure when the train pipe pressure is below brake cylinder pressure to connect the emergency reservoir to the brake cylinder to augment the brake cylinder pressure and move the triple valve back to lap position and thereby cut off communication between the emergency reservoir and the brake cylinder.

13. A triple valve controlled in its movements by the balance of train pipe, brake cylinder and emergency reservoir pressures and provided with means operating upon a slow reduction of train pipe pressure to connect the train pipe to a brake cylinder for a service application of the brakes by train pipe pressure alone, and means operating upon a sudden reduction of train pipe pressure to connect an emergency reservoir with the brake cylinder for an emergency application of the brakes, this latter emergency application means operating to connect the emergency reservoir with the brake cylinder whenever the equalized train pipe and brake cylinder pressures are insufficient to overcome the emergency reservoir pressure.

14. A triple valve controlled in its movements by the balance of train pipe, brake cylinder and emergency reservoir pressures and provided with means operating upon a slow reduction of train pipe pressure to connect the train pipe to a brake cylinder for a service application of the brakes by train pipe pressure alone, and means operating upon a sudden reduction of train pipe pressure to connect an emergency reservoir with the brake cylinder for an emergency application of the brakes, the service application means being operated by emergency reservoir pressure to compensate with train pipe air for brake cylinder leaks up to the point of equalization between brake cylinder and train pipe pressures, the emergency application means thereafter compensating with emergency reservoir air for brake cylinder or train pipe leaks whenever the combined train pipe and brake cylinder pressures are insufficient to overcome emergency reservoir pressure.

15. An air brake apparatus comprising a brake cylinder, a train pipe, an emergency reservoir, a train pipe reservoir, a triple valve formed with a train pipe chamber connected to the train pipe, a train pipe diaphragm forming one wall of said chamber, an equalizing diaphragm of larger area than the main diaphragm, a brake cylinder chamber being formed between said main and equalizing diaphragms, a service valve adapted to be operated by the movement of the main diaphragm, a normally vented chamber on the opposite side of the equalizing diaphragm from the brake cylinder chamber, an emergency reservoir diaphragm, an emergency reservoir chamber connected to the emergency reservoir, said emergency reservoir diaphragm separating the emergency reservoir chamber from the normally vented chamber, means for rigidly connecting together all of said diaphragms, an emergency valve adapted to be moved through said diaphragms to connect the emergency reservoir chamber to the brake cylinder chamber upon a sudden reduction in train pipe pressure, and means for permitting the diaphragms to move for service applications of the brakes without operating the emergency valve.

16. An air brake apparatus as defined in claim 15 and provided with a quick-release diaphragm and a quick-release valve operated by said diaphragm upon an increase in train pipe pressure to connect the emergency reservoir to the train pipe.

17. An air brake apparatus as defined in claim 15 and provided with a quick-release chamber in communication with the train pipe chamber, a quick-release diaphragm, a vent valve, and means connected to said vent valve and operated by the quick-release diaphragm upon a sudden reduction of train pipe pressure to vent the quick-release chamber and the train pipe chamber to atmosphere.

18. An air brake apparatus as defined in claim 17 and wherein the quick-release diaphragm moves upon reductions of train pipe pressure against a plurality of springs in succession, both of said springs being compressed only upon a sudden reduction in train pipe pressure for an emergency application of the brakes.

19. An air brake apparatus as defined in claim 15 and provided with a quick-release chamber in communication with the train pipe chamber, a quick-release diaphragm forming one wall of said chamber, a train pipe reservoir chamber on the opposite side of said quick-release diaphragm and connected to the train pipe reservoir, and a valve connected to the quick-release diaphragm and operated thereby upon a slow reduction of train pipe pressure to place the train pipe reservoir chamber in free communication with the quick-release chamber.

20. An air brake apparatus in accordance with claim 15 and wherein the triple valve is provided with a quick-release chamber in open communication with the train pipe chamber, a quick-release diaphragm forming one wall of said quick-release chamber, a train pipe reservoir chamber on the opposite side of said quick-release diaphragm, a valve operated by said quick-release diaphragm upon an increase of train pipe pressure to place the emergency reservoir in communication with the quick-release chamber and said chamber in communication with the train pipe reservoir chamber, a valve for opening the quick-release chamber to atmosphere, means for operating said vent valve and the quick-release valve upon a sudden reduction in train pipe pressure to open the quick-release chamber to atmosphere and to close the train pipe reservoir chamber from the quick-release chamber except for a small leak port, and means to close the vent valve when the pressures in the train pipe reservoir chamber and the quick-release chamber have equalized through said leak port.

21. An air brake apparatus in accordance with claim 20 and wherein all of the valves operated by the diaphragms are slide valves.

22. An air brake apparatus as defined in claim 20 and wherein the emergency valve closes communication between the train pipe reservoir and the train pipe reservoir chamber upon an emergency application of the brakes.

23. A triple valve in accordance with claim 1 and wherein the service valve and the emergency valve are slide valves.

24. A triple valve for air brake apparatus as defined in claim 1, and provided with means whereby the emergency valve will connect the emergency reservoir with the brake cylinder when the train pipe pressure is below the brake cylinder pressure.

25. A triple valve for air brake apparatus as defined in claim 1 and provided with a quick-release chamber, a quick-release diaphragm and a quick-release valve operated by said quick-release diaphragm upon an increase of train pipe pressure to connect an emergency reservoir with the train pipe for a quick release of the brakes.

26. A triple valve as defined in claim 10 and provided with means to prevent brake cylinder pressure flowing back to the train pipe.

27. A triple valve as defined in claim 1, and provided with means whereby the emergency valve will connect the emergency reservoir with the brake cylinder chamber when the equalized train pipe and brake cylinder pressures are insufficient to overcome the emergency reservoir pressure to thereby increase the brake cylinder pressure and assist in moving the service and emergency valves back to lap position.

In testimony whereof I hereunto affix my signature.

SPENCER G. NEAL.